(12) United States Patent
Ferris et al.

(10) Patent No.: US 8,612,577 B2
(45) Date of Patent: Dec. 17, 2013

(54) SYSTEMS AND METHODS FOR MIGRATING SOFTWARE MODULES INTO ONE OR MORE CLOUDS

(75) Inventors: James Michael Ferris, Cary, NC (US); Gerry Edward Riveros, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 397 days.

(21) Appl. No.: 12/952,701

(22) Filed: Nov. 23, 2010

(65) Prior Publication Data
US 2012/0131173 A1 May 24, 2012

(51) Int. Cl.
*G06F 15/173* (2006.01)

(52) U.S. Cl.
USPC .......................................................... 709/224

(58) Field of Classification Search
USPC .......................... 709/201–204, 224, 223, 226
See application file for complete search history.

(56) References Cited

U.S. PATENT DOCUMENTS

| | | | |
|---|---|---|---|
| 6,463,457 B1 | 10/2002 | Armentrout et al. | |
| 7,187,761 B2 * | 3/2007 | Bookstaff | 379/201.01 |
| 7,313,796 B2 | 12/2007 | Hamilton et al. | |
| 7,439,937 B2 | 10/2008 | Ben-Shachar et al. | |
| 7,529,785 B1 | 5/2009 | Spertus et al. | |
| 7,546,462 B2 | 6/2009 | Upton | |
| 7,596,620 B1 | 9/2009 | Colton et al. | |
| 8,130,928 B2 * | 3/2012 | Bookstaff | 379/201.01 |
| 8,413,145 B2 * | 4/2013 | Chou et al. | 718/1 |
| 2001/0039497 A1 | 11/2001 | Hubbard | |
| 2002/0069276 A1 | 6/2002 | Hino et al. | |
| 2002/0165819 A1 | 11/2002 | McKnight et al. | |
| 2003/0037258 A1 | 2/2003 | Koren | |
| 2003/0110252 A1 | 6/2003 | Yang-Huffman | |
| 2003/0135609 A1 | 7/2003 | Carlson et al. | |
| 2004/0162902 A1 | 8/2004 | Davis | |
| 2004/0210591 A1 | 10/2004 | Hirschfeld et al. | |
| 2004/0210627 A1 | 10/2004 | Kroening | |
| 2004/0268347 A1 | 12/2004 | Knauerhase et al. | |
| 2005/0131898 A1 | 6/2005 | Fatula | |
| 2005/0144060 A1 | 6/2005 | Chen et al. | |
| 2005/0182727 A1 | 8/2005 | Robert et al. | |
| 2005/0289540 A1 | 12/2005 | Nguyen et al. | |
| 2006/0075042 A1 | 4/2006 | Wang et al. | |
| 2006/0085530 A1 | 4/2006 | Garrett | |
| 2006/0085824 A1 | 4/2006 | Bruck et al. | |
| 2006/0130144 A1 | 6/2006 | Wernicke | |
| 2006/0177058 A1 | 8/2006 | Sarwono et al. | |
| 2006/0224436 A1 | 10/2006 | Matsumoto et al. | |

(Continued)

OTHER PUBLICATIONS

Morgan, "Systems and Methods for Detecting Resource Consumption Events Over Sliding Intervals in Cloud-Based Network", U.S. Appl. No. 13/149,235, filed May 31, 2011.

(Continued)

*Primary Examiner* — Sargon Nano
(74) *Attorney, Agent, or Firm* — Lowenstein Sandler LLP

(57) ABSTRACT

Embodiments relate to systems and methods for migrating software modules into one or more target clouds. The systems and methods can analyze system data to determine software modules supported by the system, and target cloud data to determine which target clouds have a capacity to support a migration of the software modules. In embodiments, benefits of migrating any or all of the software modules to the target clouds can be determined. Based on the benefits, the software modules of the system can be segmented and migrated into systems associated with the multiple target clouds.

20 Claims, 6 Drawing Sheets

(56) References Cited

U.S. PATENT DOCUMENTS

| | | |
|---|---|---|
| 2007/0011291 A1 | 1/2007 | Mi et al. |
| 2007/0028001 A1 | 2/2007 | Phillips et al. |
| 2007/0226715 A1 | 9/2007 | Kimura et al. |
| 2007/0283282 A1 | 12/2007 | Bonfiglio et al. |
| 2007/0294676 A1 | 12/2007 | Mellor et al. |
| 2008/0080396 A1 | 4/2008 | Meijer et al. |
| 2008/0080718 A1 | 4/2008 | Meijer et al. |
| 2008/0082538 A1 | 4/2008 | Meijer et al. |
| 2008/0082601 A1 | 4/2008 | Meijer et al. |
| 2008/0083025 A1 | 4/2008 | Meijer et al. |
| 2008/0083040 A1 | 4/2008 | Dani et al. |
| 2008/0086727 A1 | 4/2008 | Lam et al. |
| 2008/0091613 A1 | 4/2008 | Gates et al. |
| 2008/0104608 A1 | 5/2008 | Hyser et al. |
| 2008/0215796 A1 | 9/2008 | Lam et al. |
| 2008/0240150 A1 | 10/2008 | Dias et al. |
| 2008/0320121 A1* | 12/2008 | Altaf et al. .................... 709/224 |
| 2009/0012885 A1 | 1/2009 | Cahn |
| 2009/0025006 A1 | 1/2009 | Waldspurger |
| 2009/0037496 A1 | 2/2009 | Chong et al. |
| 2009/0089078 A1 | 4/2009 | Bursey |
| 2009/0099940 A1 | 4/2009 | Frederick et al. |
| 2009/0132695 A1 | 5/2009 | Surtani et al. |
| 2009/0177514 A1 | 7/2009 | Hudis et al. |
| 2009/0210527 A1 | 8/2009 | Kawato |
| 2009/0210875 A1 | 8/2009 | Bolles et al. |
| 2009/0217267 A1 | 8/2009 | Gebhart et al. |
| 2009/0222805 A1 | 9/2009 | Faus et al. |
| 2009/0228950 A1 | 9/2009 | Reed et al. |
| 2009/0248693 A1 | 10/2009 | Sagar et al. |
| 2009/0249287 A1 | 10/2009 | Patrick |
| 2009/0260007 A1 | 10/2009 | Beaty et al. |
| 2009/0265707 A1 | 10/2009 | Goodman et al. |
| 2009/0271324 A1 | 10/2009 | Jandhyala |
| 2009/0276771 A1 | 11/2009 | Nickolov et al. |
| 2009/0287691 A1 | 11/2009 | Sundaresan et al. |
| 2009/0293056 A1 | 11/2009 | Ferris |
| 2009/0299905 A1 | 12/2009 | Mestha et al. |
| 2009/0299920 A1 | 12/2009 | Ferris et al. |
| 2009/0300057 A1 | 12/2009 | Friedman |
| 2009/0300149 A1 | 12/2009 | Ferris et al. |
| 2009/0300151 A1 | 12/2009 | Friedman et al. |
| 2009/0300152 A1 | 12/2009 | Ferris |
| 2009/0300169 A1 | 12/2009 | Sagar et al. |
| 2009/0300210 A1 | 12/2009 | Ferris |
| 2009/0300423 A1 | 12/2009 | Ferris |
| 2009/0300607 A1 | 12/2009 | Ferris et al. |
| 2009/0300608 A1 | 12/2009 | Ferris et al. |
| 2009/0300635 A1 | 12/2009 | Ferris |
| 2009/0300641 A1 | 12/2009 | Friedman et al. |
| 2009/0300719 A1 | 12/2009 | Ferris |
| 2010/0022231 A1* | 1/2010 | Heins et al. .................... 455/418 |
| 2010/0027552 A1* | 2/2010 | Hill ................................ 370/401 |
| 2010/0042720 A1 | 2/2010 | Stienhans et al. |
| 2010/0050172 A1 | 2/2010 | Ferris |
| 2010/0057831 A1 | 3/2010 | Williamson |
| 2010/0058347 A1 | 3/2010 | Smith et al. |
| 2010/0076933 A1* | 3/2010 | Hamilton et al. ............. 707/640 |
| 2010/0131324 A1 | 5/2010 | Ferris |
| 2010/0131590 A1 | 5/2010 | Coleman et al. |
| 2010/0131624 A1 | 5/2010 | Ferris |
| 2010/0131649 A1 | 5/2010 | Ferris |
| 2010/0131948 A1 | 5/2010 | Ferris |
| 2010/0131949 A1 | 5/2010 | Ferris |
| 2010/0132016 A1 | 5/2010 | Ferris |
| 2010/0169477 A1 | 7/2010 | Stienhans et al. |
| 2010/0217850 A1 | 8/2010 | Ferris |
| 2010/0217864 A1 | 8/2010 | Ferris |
| 2010/0217865 A1 | 8/2010 | Ferris |
| 2010/0220622 A1 | 9/2010 | Wei |
| 2010/0250746 A1* | 9/2010 | Murase .......................... 709/226 |
| 2010/0274982 A1* | 10/2010 | Mehr et al. .................... 711/162 |
| 2010/0299366 A1 | 11/2010 | Stienhans et al. |
| 2010/0306354 A1 | 12/2010 | DeHaan et al. |
| 2010/0306377 A1 | 12/2010 | DeHaan et al. |
| 2010/0306379 A1 | 12/2010 | Ferris |
| 2010/0306566 A1 | 12/2010 | DeHaan et al. |
| 2010/0306765 A1 | 12/2010 | Dehaan |
| 2010/0306767 A1 | 12/2010 | DeHaan |
| 2010/0318609 A1* | 12/2010 | Lahiri et al. ................... 709/205 |
| 2010/0332629 A1* | 12/2010 | Cotugno et al. ............... 709/221 |
| 2011/0016214 A1* | 1/2011 | Jackson .......................... 709/226 |
| 2011/0023048 A1* | 1/2011 | Srinivasan ..................... 718/105 |
| 2011/0055034 A1 | 3/2011 | Ferris et al. |
| 2011/0055377 A1 | 3/2011 | DeHaan |
| 2011/0055378 A1 | 3/2011 | Ferris et al. |
| 2011/0055396 A1 | 3/2011 | DeHaan |
| 2011/0055398 A1 | 3/2011 | Dehaan et al. |
| 2011/0055588 A1 | 3/2011 | Dehaan |
| 2011/0075828 A1* | 3/2011 | Okita et al. ............... 379/201.02 |
| 2011/0131335 A1 | 6/2011 | Spaltro et al. |
| 2011/0231899 A1* | 9/2011 | Pulier et al. ........................ 726/1 |
| 2011/0270968 A1* | 11/2011 | Salsburg et al. ............... 709/224 |
| 2011/0271145 A1* | 11/2011 | Silberstein ....................... 714/18 |
| 2011/0283277 A1* | 11/2011 | Castillo et al. .................... 718/1 |
| 2011/0289329 A1* | 11/2011 | Bose et al. ...................... 713/320 |
| 2012/0089781 A1* | 4/2012 | Ranade et al. .................. 711/118 |
| 2012/0185913 A1* | 7/2012 | Martinez et al. ................... 726/1 |

OTHER PUBLICATIONS

Morgan, "Systems and Methods for Triggering Workload Movement Based on Policy Stack Having Multiple Selectable Inputs", U.S. Appl. No. 13/149,418, filed May 31, 2011.

Morgan, "Systems and Methods for Cloud Deployment Engine for Selective Workload Migration or Federation Based on Workload Conditions", U.S. Appl. No. 13/117,937, filed May 27, 2011.

Morgan, "Systems and Methods for Tracking Cloud Installation Information Using Cloud-Aware Kernel of Operating System", U.S. Appl. No. 13/149,750, filed May 31, 2011.

Morgan, "Systems and Methods for Introspective Application Reporting to Facilitate Virtual Machine Movement Between Cloud Hosts", U.S. Appl. No. 13/118,009, filed May 27, 2011.

Morgan, "Systems and Methods for Self-Moving Operating System Installation in Cloud-Based Network", U.S. Appl. No. 13/149,877, filed May 31, 2011.

"rBuilder and the rPath Appliance Platofrm", 2007 rPath, Inc., www.rpath.com, 3 pgs.

WhitePape—"rPath Versus Other Software Applicance Approaches", Mar. 2008, rPath, Inc. www.rpath.com, 9 pgs.

White Paper—"Best Practives for Building Virtual Appliances", 2008 rPath, Inc., www.rpath.com, 6 pgs.

DeHaan et al., "Systems and Methods for Secure Distributed Storage", U.S. Appl. No. 12/610,081, filed Oct. 30, 2009.

Ferris et al., "Methods and Systems for Monitoring Cloud Computing Environments" U.S. Appl. No. 12/627,764, filed Nov. 30, 2009.

Ferris et al., "Methods and Systems for Detecting Events in Cloud Computing Environments and Performing Actions Upon Occurrence of the Events", U.S. Appl. No. 12/627,646, filed Nov. 30, 2009.

Ferris et al, "Methods and Systems for Verifying Software License Compliance in Cloud Computing Environments", U.S. Appl. No. 12/627,643, filed Nov. 30, 2009.

Ferris et al, "Systems and Methods for Service Aggregation Using Graduated Service Levels in a Cloud Network", U.S. Appl. No. 12/628,112, filed Nov. 30, 2009.

Ferris et al, "Methods and Systems for Generating a Software License Knowledge Base for Verifying Software License Compliance in Cloud Computing Environments", U.S. Appl. No. 12/628,156, filed Nov. 30, 2009.

Ferris et al, "Methods and Systems for Converting Standard Software Licenses for Use in Cloud Computing Environments", U.S. Appl. No. 12/714,099, filed Feb. 26, 2010.

Ferris et al, "Systems and Methods for Managing a Software Subscription in a Cloud Network", U.S. Appl. No. 12/714,096, filed Feb. 26, 2010.

Ferris et al., "Methods and Systems for Providing Deployment Architectures in Cloud Computing Environments", U.S. Appl. No. 12/714,427, filed Feb. 26, 2010.

(56) References Cited

OTHER PUBLICATIONS

Ferris et al., "Methods and Systems for Matching Resource Requests with Cloud Computing Environments", U.S. Appl. No. 12/714,113, filed Feb. 26, 2010.

Ferris et al., "Systems and Methods for Generating Cross-Cloud Computing Appliances", U.S. Appl. No. 12/714,315, filed Feb. 26, 2010.

Ferris et al., "Systems and Methods for Cloud-Based Brokerage Exchange of Software Entitlements", U.S. Appl. No. 12/714,302, filed Feb. 26, 2010.

Ferris et al., "Methods and Systems FOr Offering Additional Licenses Terms During Conversion of Standard Software Licenses for Use in Cloud Computing Environments", U.S. Appl. No. 12/714,065, filed Feb. 26, 2010.

Ferris et al., "Systems and Methods for or a Usage Manager for Cross-Cloud Appliances", U.S. Appl. No. 12/714,334, filed Feb. 26, 2010.

Ferris et al., "Systems and Methods for Delivery of User-Controlled Resources in Cloud Environments Via a Resource Specification Language Wrapper", U.S. Appl. No. 12/790,294, filed May 28, 2010.

Ferris et al., "Systems and Methods for Managing Multi-Level Service Level Agreements in Cloud-Based Networks", U.S. Appl. No. 12/789,660, filed May 28, 2010.

Ferris et al., "Methods and Systems for Generating Cross-Mapping of Vendor Software in a Cloud Computing Environment", U.S. Appl. No. 12/790,527, filed May 28, 2010.

Ferris et al., "Methods and Systems for Cloud Development Analysis Featuring Relative Cloud Resource Importance", U.S. Appl. No. 12/790,366, filed May 28, 2010.

Ferris et al., "Systems and Methods for Generating Customized Build Options for Cloud Deployment Matching Usage Options", U.S. Appl. No. 12/789,701, filed May 28, 2010.

Ferris et al., "Systems and Methods for Exporting Usage History Data as Input to a Management Platform of a Target Cloud-Based Network", U.S. Appl. No. 12/790,415, filed May 28, 2010.

Ferris et al., "Systems and Methods for Cross-Vendor Service in Cloud Networks", U.S. Appl. No. 12/790,162, flied May 28, 2010.

Ferris et al., "Systems and Methods for Cross-Cloud Vendor Mapping Service in a Dynamic Cloud Marketplace", U.S. Appl. No. 121790,229, filed May 28, 2010.

Ferris et al., "Systems and Methods for Aggregate Monitoring of Utilization Data for Vendor Products in Cloud Networks", U.S. Appl. No. 12/790,039, filed May 28, 2010.

Ferris et al., "Systems and Methods for Combinatorial Optimization of Multiple Resources Across a Set of Cloud-Based Networks", U.S. Appl. No. 12/953,718, filed Nov. 24, 2010.

Ferris et al., "Systems and Methods fo Matching a Usage History to a New Cloud" U.S. Appl. No. 12/953,757, filed Nov. 24, 2010.

Ferris et al., "Systems and Methods for Identifying Usage Histories for Producing Optimized Cloud Utilization", U.S. Appl. No. 12/952,930, filed Nov. 23, 2010.

Ferris et al., "Systems and Methods for identifying Service Dependencies a Cloud Deployment", U.S. Appl. No. 12/952,857, filed Nov. 23.2010.

Ferris et al., "System and Methods for Migrating Subscribed Services in a Cloud Deployment", U.S. Appl. No. 12/955,277, filed Nov. 29, 2010.

Ferris et al., "Systems and Methods for Migrating Subscribed Services from a Set of Clouds to a Second Set of Clouds", U.S. Appl. No. 12/957,281, filed Nov. 30, 2010.

Morgan, "Systems and Methods for Generating Multi-Cloud Incremental Billing Capture and Administration", U.S. Appl. No. 12/954,323, filed Nov. 24, 2010.

Morgan, "System and Methods for Aggregating Marginal Subscription offsets in Set of Multiple Host Clouds", U.S. Appl. No. 12/954,400, filed Nov. 24, 2010.

Morgan, "Systems and Methods for Generating Dynamically Configurable Subscription Parameters for Temporary Migration of Predictive User Workloads in Cloud Network", U.S. Appl. No. 12/954,378, filed Nov. 24, 2010.

Morgan, "Systems and Methods for Managing Subscribed Resource Limits in Cloud Network Using Variable or Instantaneous Consumption Tracking Periods", U.S. Appl. No. 12/964,352, filed Nov. 24, 2010.

Ferris et al. "Systems and Methods for Brokering Optimized Resource Supply Costs in Host Cloud-Based Network Using Predictive Workloads", U.S. Appl. No. 12/957,274, filed Nov. 30, 2010.

Ferris et al, "Systems and Methods for Reclassifying Virtual Machines to Target Virtual Machines or Appliances Based on Code Analysis in a Cloud Environment", U.S. Appl. No. 12/957,267, filed Nov. 30, 2010.

Morgan, "Systems and Methods for Generating Optimized Resource Consumption Periods for Multiple Users on Combined Basis", U.S. Appl. No. 13/037,359, filed Mar. 1, 2011.

Morgan, "Systems and Methods for Metering Cloud Resource Consumption Using Multiple Hierarchical Subscription Periods", U.S. Appl. No. 13/037,360, filed Mar. 1, 2011.

Morgan "Systems and Methods for Generating Marketplace Brokerage Exchange of Excess Subscribed Resources Using Dynamic Subscription Periods", U.S. Appl. No. 13/037,351, filed Feb. 28, 2011.

\* cited by examiner

SYSTEMS AND METHODS FOR MIGRATING SOFTWARE MODULES INTO ONE OR MORE CLOUDS

FIELD

The present teachings relate to systems and methods for migrating software modules installed on a virtual machine into one or more clouds, and more particularly to platforms and techniques for migrating system software modules into one or more clouds based on a code analysis.

BACKGROUND OF RELATED ART

Cloud computing environments utilize shared resources, software, and information that can be provided for use by end users. For example, a service level agreement (SLA) can be entered into between a vendor, such as an independent software vendor (ISV), and a cloud network provider whereby the cloud network provider agrees to commit an amount of resources associated with virtual machines in the cloud network for use by end users during operation of software products and applications of the vendor. In return, the cloud network provider can charge the vendor a specified rate in proportion to the amount of committed resources. The cloud network provider provides or maintains an amount of resources in the cloud network, such as server uptime, persistent storage, software application instantiation, network performance, cloud storage, support response time, and other elements.

The end users can utilize applications or software modules that are supported by systems of virtual machines in a cloud network. An administrator of the cloud network may wish to optimize usage of the systems that support the applications. More particularly, the administrator may want to employ systems that maximize the efficiency of application consumption metrics. However, it is sometimes the case that the actual application consumption metrics by the applications in the systems is not maximized or optimal. Further, the administrator of the cloud network may desire to locate additional cloud networks that contain additional systems to optimize the end user application usage. Still further, conventional systems do not apply static or dynamic code analytics to determine potential module migrations Therefore, it may be desirable to provide systems and methods for migrating system software modules into one or more clouds. In particular, it may be desirable to migrate system software modules into one or more clouds based on a code analysis, from which an advantage, benefit, efficiency gain, and/or other effect can be realized.

DESCRIPTION OF EMBODIMENTS

Figure 1:
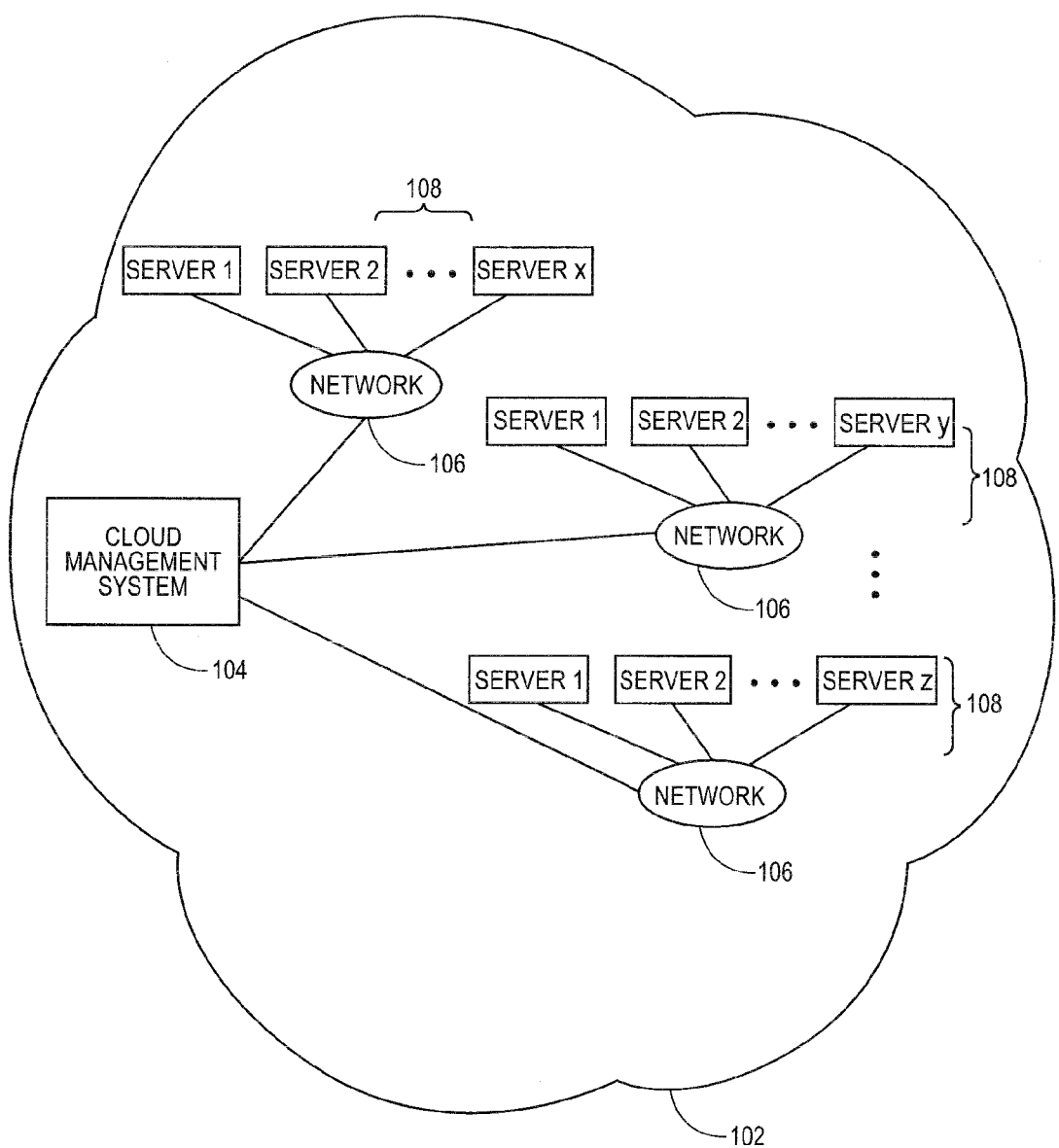
FIG. 1 illustrates an overall cloud system architecture in which various embodiments of the present teachings can be practiced.

Embodiments of the present teachings relate to systems and methods for migrating system software modules into one or more target clouds. In particular, embodiments relate to migrating system software modules into one or more target clouds based on a code analysis of the system, from which an advantage, benefit, efficiency gain, and/or other effect can be realized. The target clouds can have a specified amount of resources to execute the software modules and to be utilized by, for example, end users. For example, the resources of the target clouds can be deployed as a Software as a Service (SaaS). An administrator of a host cloud or another cloud can desire to migrate or re-deploy software modules from the host cloud to the target clouds.

According to embodiments, a module migration tool or other logic can analyze a system in a host cloud to determine the software modules utilized by the system. The module migration tool can interface with a set of target clouds comprising systems of virtual machines or other resources capable of supporting the software modules of the host cloud. In embodiments, the module migration tool can analyze the systems of the set of target clouds to determine benefits of migrating the software modules to the set of target clouds. The module migration tool can migrate the software modules from the host cloud into the set of target clouds such that the software modules go from a single-cloud system to a multi-cloud system, whereby support of the software modules can be better optimized.

In embodiments, the module migration tool can be configured to provide relevant data or information to an administrator of any of the clouds such that the administrator can determine a migration plan for the software modules. For example, the administrator may wish to use system analysis data or other data to examine or generate a business model based on an hourly rate, consumption rate, or other metrics, and determine potential candidate clouds based on any relevant business models.

Embodiments as described herein can be implemented in or supported by a cloud network architecture. As used herein, a "cloud" can refer to a cloud-based network comprising a collection of resources that can be invoked to instantiate a virtual machine, process, or other resource for a limited or defined duration. As used herein, an "end user" can refer to a person, customer, subscriber, corporation, organization, or other entity accessing files and/or devices storing the files in the cloud. In embodiments, the end user can operate or manage computer software or hardware that can access files and/or devices storing the files in the cloud-based network. Further, as used herein, an "administrator" of a cloud can refer to a person, owner, corporation, organization, or other entity having authoritative power to initialize, oversee, or otherwise manage the operation of a cloud.

As used herein, the "system" of a cloud can refer to software and hardware as a whole such as, for example, applications, programs, servers, device drivers, storage such as hard drives, virtual memory, databases, random access memory (RAM) and other memory, processors, multimedia cards, and the like, in the cloud. The system can be accessed by users or by software or applications independent from or associated with the system of the cloud, in embodiments, vendors such as ISVs can supply software resources for use with the system in the cloud. The system can further comprise any communications resources, such as ports or channels provided to a virtual machine or other machine or process in the cloud. The system can also support services, such as Web-based services deployed in the cloud, for example security or identity management services and/or other resources. As used herein, a "module" or "software module" can refer to any type of software application, program, computer code, and the like, that is part of the system of the cloud. The software modules can be executed by users, the system itself, an administrator, or any other entity.

As used herein, an "analysis" can be any static or dynamic analysis performed on a software module, program data, or program code that can be examined to determine an advantage, benefit, efficiency gain, and/or other effect of a migration. As used herein, "optimize" can be a general term that can refer to the best available option. In other words, an "optimized" configuration need not represent the best possible configuration, but instead can mean the preferred configuration of the possible configurations. Further, the term "optimize" can also mean maximize, enhance, improve, or other terms related to a preferred or improved performance level. Still further, as used herein, a "simulation" can refer to a projection, model, analysis, assessment, breakdown, evaluation, and other terms that can refer to any type of analysis of data.

FIG. 1 illustrates an overall cloud system architecture in which various embodiments of the present teachings can be practiced. As shown for example in FIG. 1, the collection of resources supporting a cloud 102 can comprise a set of resource servers 108 configured to deliver computing components needed to instantiate a virtual machine, process, or other resource. For example, one group of resource servers can host and serve an operating system or components thereof to deliver to and instantiate a virtual machine. Another group of resource servers can accept requests to host computing cycles or processor time, to supply a defined level of processing power for a virtual machine. A further group of resource servers can host and serve applications to load on an instantiation of a virtual machine, such as an email client, a browser application, a messaging application, or other applications or software. Other types of resource servers are possible.

In embodiments, the entire set of resource servers 108 or other hardware or software resources used to support the cloud 102 along with its instantiated virtual machines is managed by a cloud management system 104. The cloud management system 104 can comprise a dedicated or centralized server and/or other software, hardware, and network tools that communicate via network 106 such as the Internet or other public or private network with all sets of resource servers to manage the cloud 102 and its operation. To instantiate a new set of virtual machines, a user can transmit an instantiation request to the cloud management system 104 for the particular type of virtual machine that the user desires to invoke for its intended application. A user can for instance make a request to instantiate a set of virtual machines configured for email, messaging or other applications from the cloud 102. The request can be received and processed by the cloud management system 104, which identifies the type of virtual machine, process, or other resource being requested. The cloud management system 104 can then identify the collection of resources necessary to instantiate that machine or resource. In embodiments, the set of instantiated virtual machines or other resources can for example comprise virtual transaction servers used to support Web storefronts, or other transaction sites.

In embodiments, the user's instantiation request can specify a variety of parameters defining the operation of the set of virtual machines to be invoked. The instantiation request, for example, can specify a defined period of time for which the instantiated machine or process is needed. The period of time can be, for example, an hour, a day, or other increment of time. In embodiments, the user's instantiation request can specify the instantiation of a set of virtual machines or processes on a task basis, rather than for a predetermined amount of time. For instance, a user could request resources until a software update is completed. The user's instantiation request can specify other parameters that define the configuration and operation of the set of virtual machines or other instantiated resources. For example, the request can specify an amount of processing power or input/output (I/O) throughput the user desires to be available to each instance of the virtual machine or other resource. In embodiments, the requesting user can for instance specify a service level agreement (SLA) acceptable for their purposes. Other parameters and settings can be used. One skilled in the art will realize that the user's request can likewise include combinations of the foregoing exemplary parameters, and others.

When the request to instantiate a set of virtual machines or other resources has been received and the necessary resources to build that machine or resource have been identified, the cloud management system 104 can communicate with one or more of the set of resource servers 108 to locate resources to supply the required components. The cloud management system 104 can select providers from the diverse set of resource servers 108 to assemble the various components needed to build the requested set of virtual machines or other resources. It may be noted that in some embodiments, permanent storage such as hard disk arrays may not be included or located within the set of resource servers 108 available to the cloud management system 104, since the set of instantiated virtual machines or other resources may be intended to operate on a purely transient or temporary basis. In embodiments, other hardware, software or other resources not strictly located or hosted in the cloud can be leveraged as needed. For example, other software services that are provided outside of the cloud 102 and hosted by third parties can be invoked by in-cloud virtual machines. For further example, other non-cloud hardware and/or storage services can be utilized as an extension to the cloud 102, either on an on-demand or subscribed or decided basis.

With the resource requirements identified, the cloud management system 104 can extract and build the set of virtual machines or other resources on a dynamic or on-demand basis. For example, one set of resource servers 108 may respond to an instantiation request for a given quantity of processor cycles with an offer to deliver that computational power immediately and guaranteed for the next hour. A further set of resource servers 108 can offer to immediately supply communication bandwidth, for example on a guaranteed minimum or best-efforts basis. In other embodiments, the set of virtual machines or other resources can be built on a batch basis or at a particular future time. For example, a set of resource servers 108 may respond to a request for instantiation at a programmed time with an offer to deliver the specified quantity of processor cycles within a specific amount of time, such as the next 12 hours.

The cloud management system 104 can select groups of servers in the set of resource servers 108 that match or best match the instantiation request for each component needed to build the virtual machine or other resource. The cloud management system 104 can then coordinate the integration of the completed group of servers from the set of resource servers 108, to build and launch the requested set of virtual machines or other resources. The cloud management system 104 can track the combined group of servers selected from the set of resource servers 108, or other distributed resources that are dynamically or temporarily combined, to produce and manage the requested virtual machine population or other resources.

In embodiments, the cloud management system 104 can generate a resource aggregation table that identifies the various sets of resource servers that will be used to supply the components of the virtual machine or process. The sets of resource servers can be identified by unique identifiers such as, for instance, Internet protocol (IP) addresses or other addresses. The cloud management system 104 can register the finalized group of servers in the set of resource servers 108 contributing to an instantiated machine or process.

The cloud management system 104 can then set up and launch the initiation process for the virtual machines, processes, or other resources to be delivered from the cloud. The cloud management system 104 can for instance transmit an instantiation command or instruction to the registered group of servers in the set of resource servers 108. The cloud management system 104 can receive a confirmation message back from each participating server in the set of resource servers 108 indicating a status regarding the provisioning of their respective resources. Various sets of resource servers may confirm, for example, the availability of a dedicated amount of processor cycles, amounts of electronic memory, communications bandwidth, or applications or other software prepared to be served.

Figure 2:
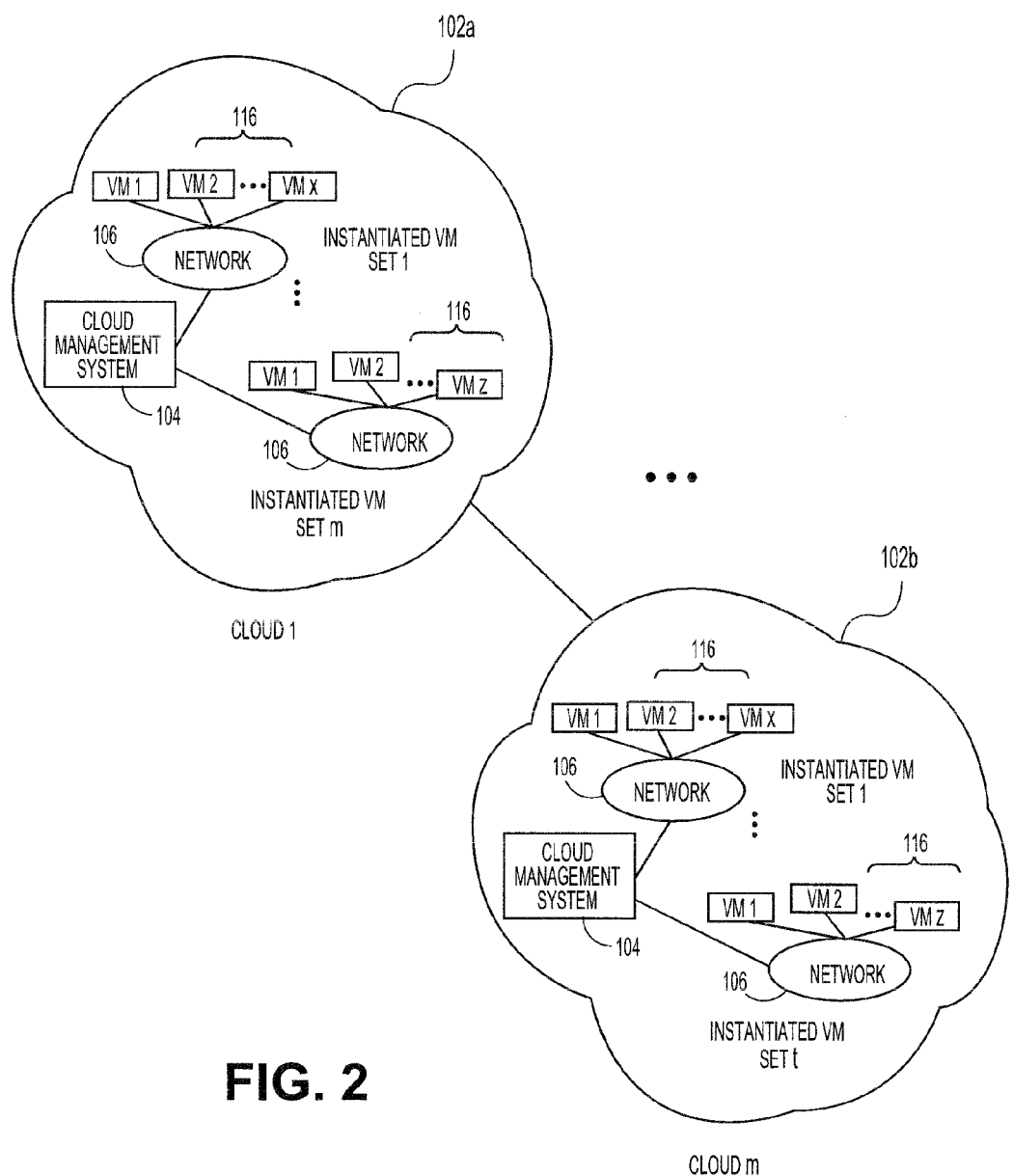
FIG. 2 illustrates an overall cloud system architecture including multiple cloud arrangements in which various embodiments of the present teachings can be practiced in another regard, according to various embodiments.

As shown for example in FIG. 2, the cloud management system 104 can then instantiate one or more than one set of virtual machines 116, or other processes based on the resources supplied by the registered set of resource servers 108 (shown in FIG. 1). In embodiments, the cloud management system 104 can instantiate a given number, for example, 10, 500, 1000, or other numbers of virtual machines to be made available to users on a network 106, such as the Internet or other public or private network. Each virtual machine can be assigned an instantiated machine ID that can be stored in the resource aggregation table, or other record or image of the instantiated population. Additionally, the cloud management system 104 can store the duration of each virtual machine and the collection of resources utilized by the complete set of instantiated virtual machines 116.

In embodiments, the cloud management system 104 can further store, track, and manage a user's identity and associated set of rights or entitlements to software, hardware, and other resources. Each user that populates a set of virtual machines in the cloud can have specific rights and resources assigned and made available to them. The cloud management system 104 can track and configure specific actions that a user can perform, such as provision a set of virtual machines with software applications or other resources, configure a set of virtual machines to desired specifications, submit jobs to the set of virtual machines or other host, manage other users of the set of instantiated virtual machines 116 or other resources, and other privileges or actions. The cloud management system 104 can further generate records of the usage of instantiated virtual machines to permit tracking, billing, and auditing of the services consumed by the user. In embodiments, the cloud management system 104 can for example meter the usage and/or duration of the set of instantiated virtual machines 116, to generate subscription billing records for a user that has launched those machines. Other billing or value arrangements are possible.

The cloud management system 104 can configure each virtual machine to be made available to users of the network 106 via a browser interface, or other interface or mechanism. Each instantiated virtual machine can communicate with the cloud management system 104 and the underlying registered set of resource servers 108 via a standard Web application programming interface (API), or via other calls or interfaces. The set of instantiated virtual machines 116 can likewise communicate with each other, as well as other sites, servers, locations, and resources available via the Internet or other public or private networks, whether within a given cloud 102*a*, 102*b* or between clouds.

It may be noted that while a browser interface or other front-end can be used to view and operate the set of instantiated virtual machines 116 from a client or terminal, the processing, memory, communications, storage, and other hardware as well as software resources required to be combined to build the virtual machines or other resources are all hosted remotely in the cloud 102*a*, 102*b*. In embodiments, the set of virtual machines 116 or other resources may not depend on or require the user's own on-premise hardware or other resources. In embodiments, a user can therefore request and instantiate a set of virtual machines or other resources on a purely off-premise basis, for instance to build and launch a virtual storefront or other application.

Because the cloud management system 104 in one regard specifies, builds, operates and manages the set of instantiated virtual machines 116 on a logical level, the user can request and receive different sets of virtual machines and other resources on a real-time or near real-time basis, without a need to specify or install any particular hardware. The user's set of instantiated machines 116, processes, or other resources can be scaled up or down immediately or within a short period of time on an on-demand basis, if desired. In embodiments, the various sets of resource servers that are accessed by the cloud management system 104 to support a set of instantiated virtual machines 116 or processes can change or be substituted, over time. The type and operating characteristics of the set of instantiated virtual machines 116 can nevertheless remain constant or almost constant, since instances are assembled from abstracted resources that can be selected and maintained from diverse sources based on uniform specifications.

In terms of network management of the set of virtual machines 116 that have been successfully configured and instantiated, the cloud management system 104 can perform various network management tasks including security, maintenance, and metering for billing or subscription purposes. The cloud management system 104 of a given cloud 102*a*, 102*b* can, for example, install or terminate applications or appliances on individual machines. The cloud management system 104 can monitor operating virtual machines to detect any virus or other rogue process on individual machines, and for instance terminate the infected application or virtual machine. The cloud management system 104 can likewise manage an entire set of instantiated virtual machines 116 or other resources on a collective basis, for instance, to push or deliver a software upgrade to all active virtual machines. Other management processes are possible.

In embodiments, more than one set of virtual machines can be instantiated in a given cloud at the same, overlapping, or successive times. The cloud management system 104 can, in such implementations, build, launch, and manage multiple sets of virtual machines based on the same or different underlying set of resource servers 108, with populations of different instantiated virtual machines 116 such as may be requested by different users. The cloud management system 104 can institute and enforce security protocols in a cloud 102a, 102b hosting multiple sets of virtual machines. Each of the individual sets of virtual machines can be hosted in a respective partition or sub-cloud of the resources of the main cloud 102a, 102b. The cloud management system 104 of a cloud can for example deploy services specific to isolated or defined sub-clouds, or isolate individual workloads/processes within the cloud to a specific sub-cloud. The subdivision of the cloud 102a, 102b into distinct transient sub-clouds or other sub-components which have assured security and isolation features can assist in establishing a multiple user or multi-tenant cloud arrangement. In a multiple user scenario, each of the multiple users can use the cloud platform as a common utility while retaining the assurance that their information is secure from other users of the overall cloud system. In further embodiments, sub-clouds can nevertheless be configured to share resources, if desired.

In embodiments, and as also shown in FIG. 2, the set of instantiated virtual machines 116 generated in a first cloud 102a can also interact with a set of instantiated virtual machines or processes generated in a second, third or further cloud 102b. Further, the cloud management system 104 of the first cloud 102a can interface with the cloud management system 104 of the second cloud 102b, to coordinate those domains and operate the clouds and/or virtual machines or processes on a combined basis. The cloud management system 104 of a given cloud 102a, 102b can track and manage individual virtual machines or other resources instantiated in that cloud, as well as the set of instantiated virtual machines or other resources in other clouds.

Figure 3:
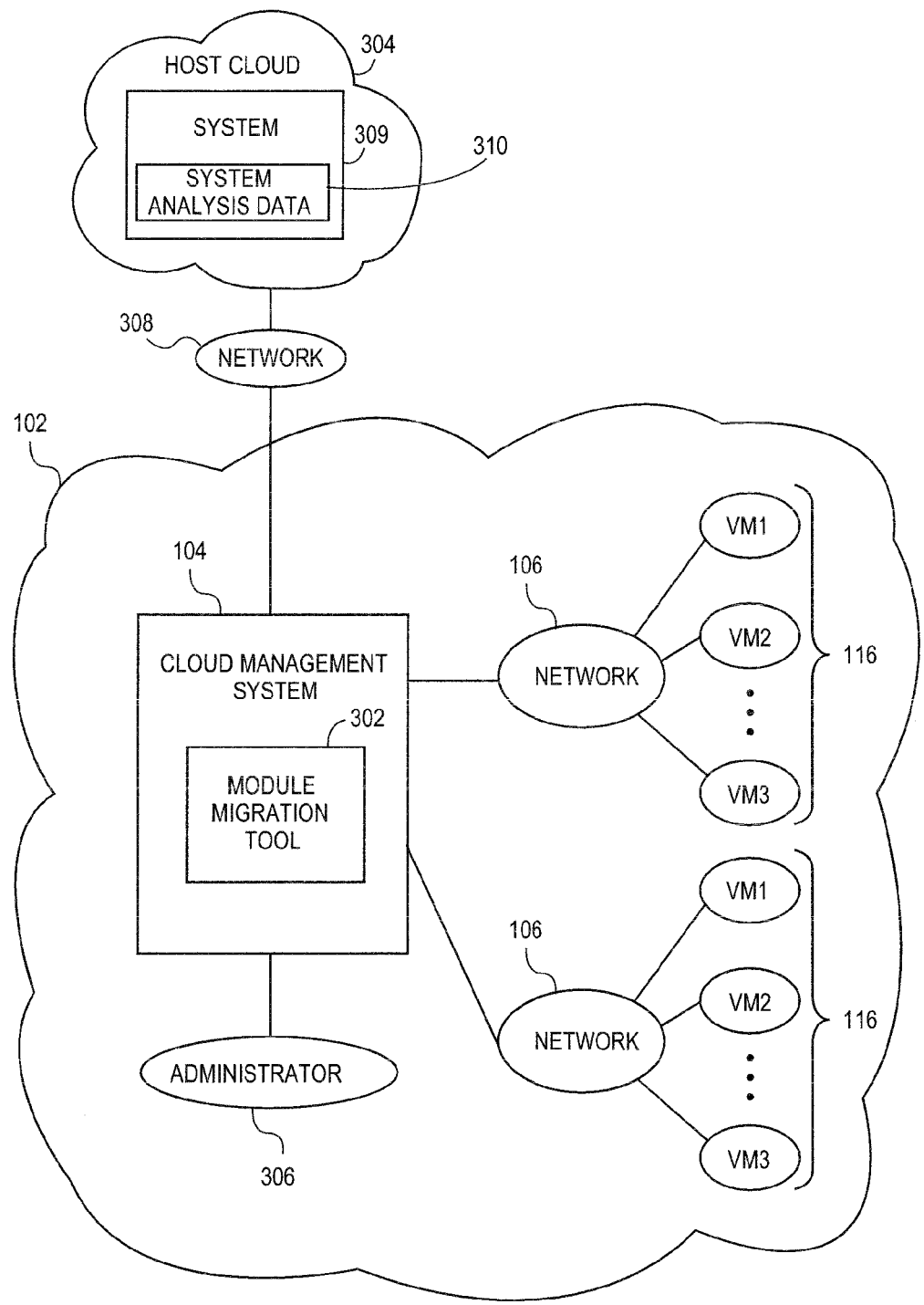
FIG. 3 illustrates an exemplary network configuration that can be used in systems and methods for migrating system software modules into one or more clouds, according to various embodiments.

FIG. 3 illustrates an exemplary network configuration that can be used in systems and methods for migrating system software modules into one or more clouds. In embodiments as shown, the cloud management system 104 of a target cloud 102 can comprise a module migration tool 302 configured to interface with an administrator 306 and with the set of instantiated virtual machines 116 via the one or more networks 106. The module migration tool 302 can further be configured to interface with a host cloud 304 via a network 308, or the network 106. It should be appreciated that the module migration tool 302 can be implemented on other hardware and/or software components or can be configured to interface with the other components and entities described herein. In embodiments, the module migration tool 302 can receive and analyze system analysis data 310 for potential migration of software modules associated with a system 309 of the host cloud 304.

Further, it should be appreciated that the module migration tool 302 can be configured to interface with additional existing host clouds 304 or target clouds 102 (not shown in figures) and associated system resources, such as virtual machines, of the additional host clouds 304 or target clouds 102. Further still, it should be clear that although FIG. 3 depicts the module migration tool 302 in association with the cloud management system 104 of the target cloud 102, in certain embodiments the module migration tool 302 can instead be associated with the host cloud 304, as well as with multiple host clouds 304.

In embodiments, the administrator 306 can be any person, owner, corporation, organization, or other entity having authoritative power to initialize, oversee, or otherwise manage the operation of the target cloud 102. In embodiments, the administrator 306 can manage the delivery or provisioning of software applications, or other software, hardware, or other products or services, such as products and services of one or more ISVs (not shown in figures), to end users accessing the target cloud 102. In embodiments, the end users can access the set of instantiated virtual machines 116 located in the target cloud 102. It should be appreciated that the administrator 306 can enter into one or more service agreements with vendors or other entities to provide resources to end users in one or multiple clouds, and/or across multiple products and/or product lines. It should further be appreciated that the administrator 306 can oversee multiple target or candidate clouds, and can communicate and contact other respective administrators of the multiple target or candidate clouds.

The module migration tool 302 can receive the system analysis data 310 associated with the system 309 of the host cloud 304. In embodiments, the system analysis data 310 can comprise data associated with software modules of the system 309. For example, the system analysis data 310 can detail the software modules that execute on or are otherwise supported by the system 309. In embodiments, the system analysis data 310 can detail an analysis of program code associated with the software modules. For example, the system analysis data 310 can comprise input/output (I/O) data, memory usage data, storage data, central processing unit (CPU) consumption data and other processing data, redundancy data, network transmission data, and any other data associated with an execution or support of software modules or other resources of the system 309.

In embodiments, the module migration tool 302 can statically or dynamically simulate, model, or otherwise analyze the system analysis data 310 associated with the system 309 to determine information related to the software modules. For example, the module migration tool 302 can determine, from the system analysis data 310, how much memory a certain module users over a certain time period. For further example, the module migration tool 102 can determine, from the system analysis data 310, the daily average amount of data that another module transfers. It should be appreciated that the module migration tool 302 can determine any other metrics associated with the software modules from the system analysis data 310. In embodiments, the module migration tool 302 can perform a static analysis on a header file, a manifest file, a metadata file, or the like that can specify resources required by a service, an application, and/or a virtual machine.

In embodiments, the module migration tool 302 can receive, determine, or detect data relating to the target cloud 102 and other target clouds. The module migration tool 302 can simulate, model, or otherwise analyze the data relating to the target cloud 102 and other target clouds to determine the ability of the target cloud 102 and other target clouds to initialize, execute, or otherwise support any of the software modules specified in the system analysis data 310. For example, the module migration tool 302 can detect that the target cloud 102 has the ability to initialize, execute, or otherwise support a database interface module of the system 309. For further example, the module migration tool 302 can detect that the target cloud 102 has the ability to initialize, execute, or otherwise support a file transfer protocol (ftp) module of the system 309.

Still further, in embodiments, the module migration tool 302 can perform any sort of benefit simulation, model, or analysis to determine which ones of the software modules would benefit from a migration to the target cloud 102 and other target clouds. For example, the module migration tool 302 can determine that an email module of the system 309 would benefit from a migration to a target cloud that can offer more efficient storage. For further example, the module migration tool 302 can determine that a word processing module would benefit from a migration to a target cloud that can offer more processing power. For further example, the module migration tool 302 can determine that an instant messaging module would benefit from a migration to a target cloud that can offer a better data transfer rate. It should be envisioned that the module migration tool 302 can determine any sort of benefit to migrating any module of the system to any target cloud.

As an output, the benefit analysis can yield a determination as to whether it is beneficial, for any reason, to migrate one or more of the software modules of the system 309 to the target cloud 102 and/or other target clouds. For example, the benefit analysis can indicate that migrating each of the software modules of the system 309 into separate target clouds is beneficial for cost purposes. For further example, the benefit analysis can indicate that migrating some of the software modules of the system 309 into separate target clouds is beneficial for resource consumption purposes.

In embodiments, the dependency module 302 can migrate any of the software modules of the system 309 into the target cloud 102 and any other target clouds based on the benefit analysis. In embodiments, an agreement such as an SLA can be entered into among one or more respective cloud providers, one or more vendors, and/or one or more end users. It should be appreciated that the software modules can be deployed on any resources of any cloud in any combination.

In embodiments, the module migration tool 302 can notify the administrator 306 of the benefits of migrating the software modules to the target cloud 102 and/or other target clouds. In embodiments, the administrator 306 can be notified of any of the results of the analyses performed by module migration tool 302, in any way, and via any data communication. Further, in embodiments, the module migration tool 302 can generate or provide a migration recommendation or offer to an administrator, owner, or other user associated with the host cloud 304, or other clouds. Further, in embodiments, the offer can be directed to multiple administrators or entities associated with multiple clouds having the capability to support the software modules. For example, if resources in exemplary target clouds A and B can support software modules indicated in the system analysis data 310 and already deployed on a host cloud C, then one or more administrators of target clouds A and B can be contacted in an effort to migrate the software modules to target clouds A and B. It should be appreciated that the administrator 306 or other entity can contact an administrator or a user associated with any existing clouds, in any way, with any type of information or offer.

Figure 4:
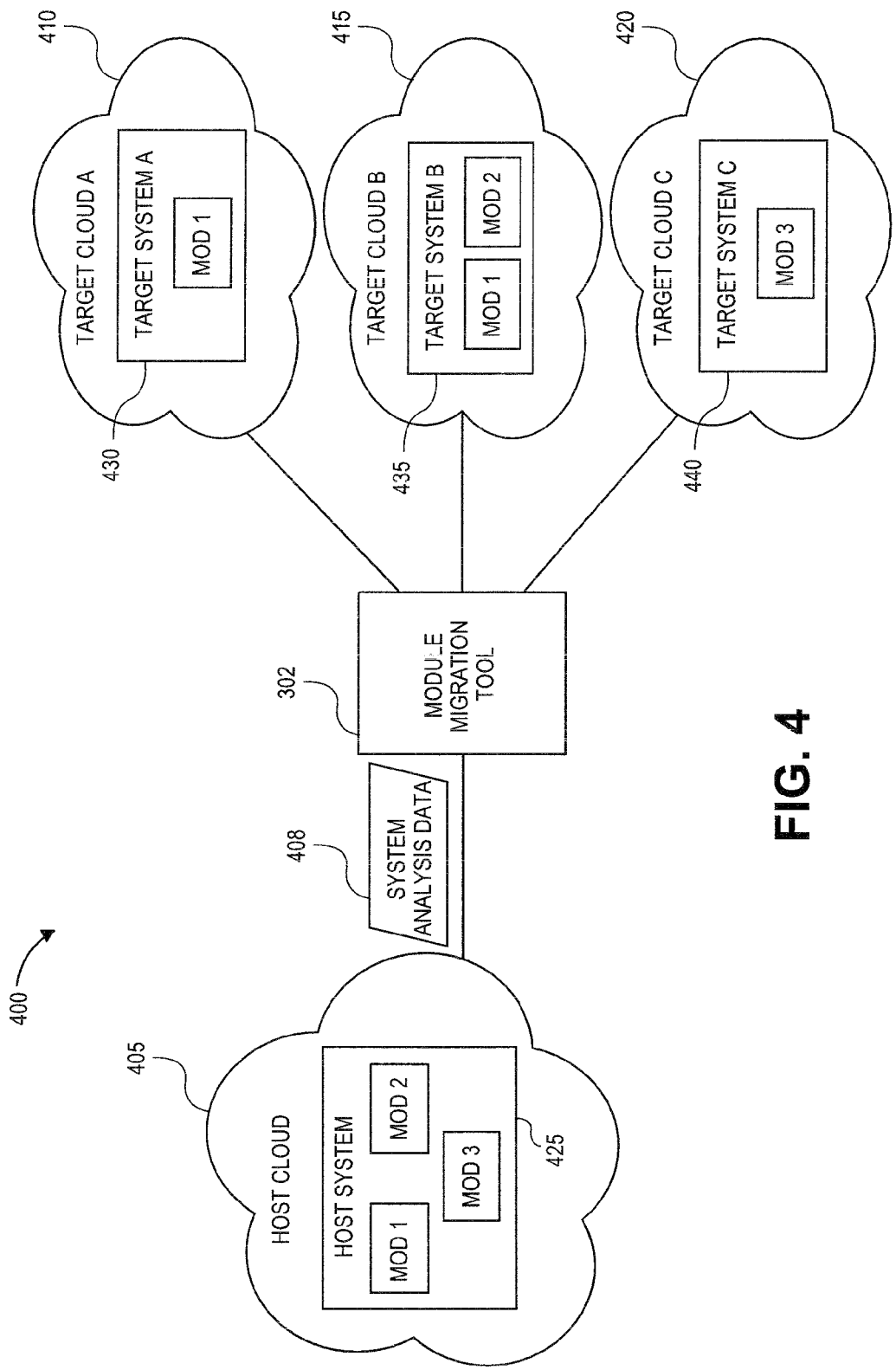
FIG. 4 illustrates an exemplary network diagram exploring a migration of a set of software modules, according to various embodiments.

FIG. 4 is an exemplary configuration 400 depicting a potential migration of system services. It should be appreciated that the values, variables, and arrangements as shown in FIG. 4 are for illustration purposes and can be any value, variable, and arrangement. The configuration 400 comprises a host cloud 405, the module migration tool 302, and three target clouds, namely, target cloud A 410, target cloud B 415, and target cloud C 420. As shown in FIG. 4, the host cloud 405 can comprise a host system 425 that can support the operation of three software modules, namely, MOD 1, MOD 2, and MOD 3. In embodiments, the host system 425 can comprise one or more virtual machines (not shown in FIG. 4). The module migration tool 302 can be configured to receive system analysis data 408 comprising data regarding the software modules MOD 1, MOD 2, and MOD 3. In embodiments, the system analysis data 408 can comprise metrics related to resource consumption by the software modules MOD 1, MOD 2, and MOD 3 in the host system 425, as discussed herein.

In embodiments, each of the target clouds 410, 415, and 420 can have the ability or capacity to support one or more software modules. In some embodiments, the module migration tool 302 can determine, from the system analysis data 408, the capacities of target systems A, B, and C 430, 435, and 440 of target clouds A, B, and C 410, 415, and 420 to support any of the software modules MOD 1, MOD 2, and MOD 3. In other embodiments, the module migration tool 302 can detect data associated with the target systems A, B, and C 430, 435, and 440 of target clouds A, B, and C 410, 415, and 420 to determine resource metrics associated with the respective systems. For example, as shown in FIG. 4, target system A 430 of target cloud A 410 has the ability to support MOD 1, target system B 435 of target cloud B 415 has the ability to support MOD 1 and MOD 2, and target system C 440 of target cloud C 420 has the ability to support MOD 3.

The module migration tool 302 can determine which of the software modules MOD 1, MOD 2, and MOD 3 can benefit from a migration to any of the target clouds A, B, and C 410, 415, and 420. The benefits can be associated with any system resource metrics and can be determined from the system analysis data 408 and/or the data associated with the target systems A, B, and C 430, 435, and 440. For example, as shown in FIG. 4, even though both target system A 430 and target system B 435 have the ability to support MOD 1, the module migration tool 302 can determine that MOD 1 would benefit more if it was supported by target system A 430 rather than target system B 435. For example, if operation of MOD 1 leads to a high CPU consumption, and target system A 430 has better processing power than does target system B 430, then MOD 1 can benefit more it migrated to target system A 430.

The module migration tool 302 can migrate the software modules MOD 1, MOD 2, and MOD 3 into the target clouds that are most optimized for supporting the software modules, or into the target clouds that most benefit the support of software modules MOD 1, MOD 2, and MOD 3. For example, as shown in FIG. 4, target system B 435 and target system C 440 are most optimized for supporting MOD 2 and MOD 3, respectfully. Further, assuming that target system A 430 is better optimized for supporting MOD 1 than is target system B 435, then module migration tool 302 can also migrate MOD 1 into target system A 430. It should be appreciated that the module migration tool 302 or other logic can employ any calculations, simulations, or models to examine capacity issues, benefits of, and optimizations in, between, or among any of the target clouds 410, 415, and 420.

Figure 5:
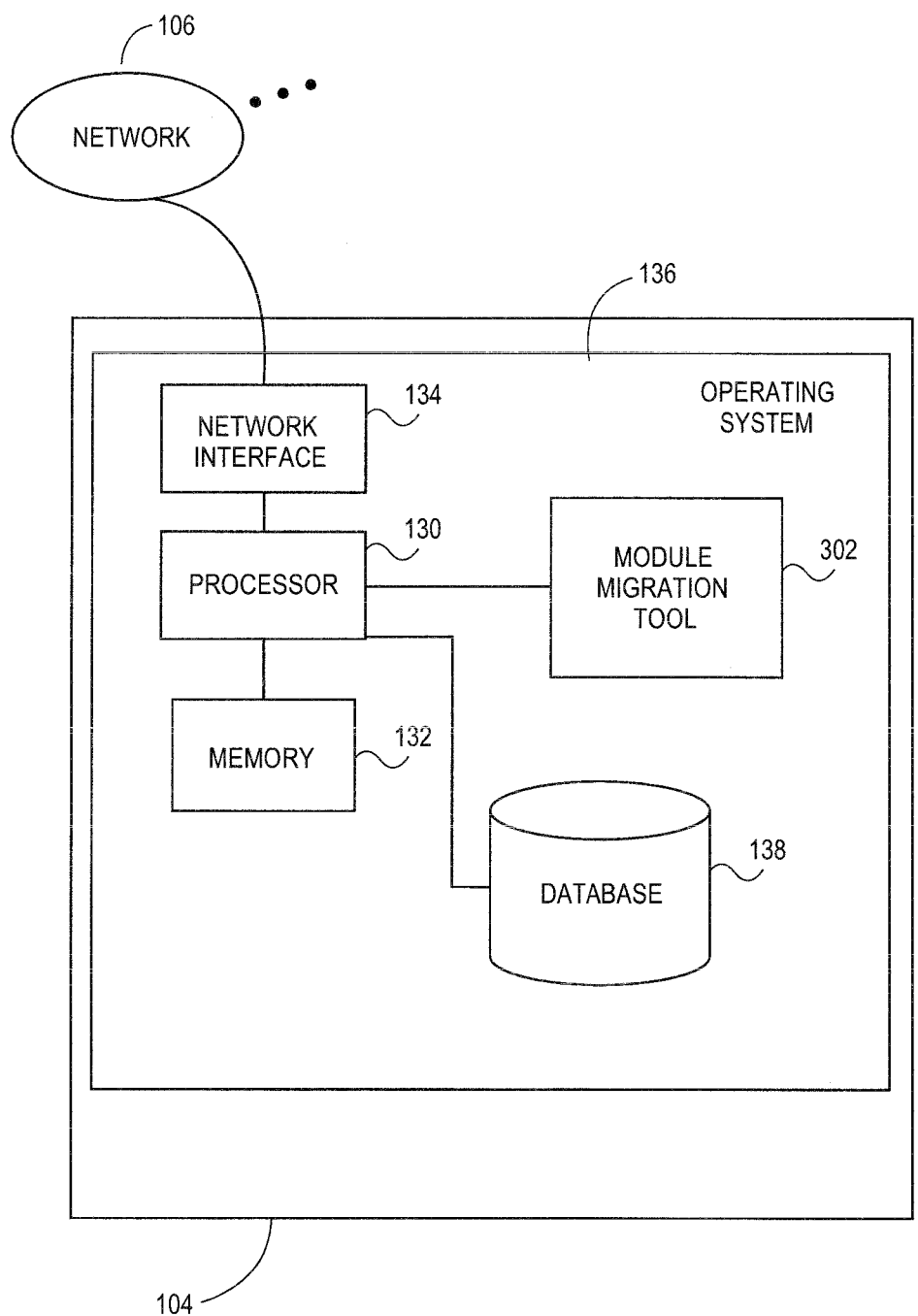
FIG. 5 illustrates an exemplary hardware configuration for a cloud-based management system, according to various embodiments.

FIG. 5 illustrates an exemplary diagram of hardware and other resources that can be incorporated in a cloud management system 104 configured to communicate with a set of instantiated virtual machines 116 (as shown in FIG. 2) via one or more networks 106, according to embodiments. In embodiments as shown, the cloud management system 104 can comprise a processor 130 communicating with memory 132, such as electronic random access memory, operating under control of or in conjunction with operating system 136. Operating system 136 can be, for example, a distribution of the Linux™ operating system, the Unix™ operating system, or other open-source or proprietary operating system or platform. Processor 130 also communicates with one or more computer readable storage medium 138, such as hard drives, optical storage, databases, and the like. Processor 130 further communicates with network interface 134, such as an Ethernet or wireless data connection, which in turn communicates with one or more networks 106, such as the Internet or other public or private networks.

Processor 130 can also communicate with computer readable storage medium 138 and the module migration tool 302, to execute control logic, identify usage histories for producing optimized cloud utilization in the cloud 102 as described herein, and control the operation of virtual machines and other resources in cloud 102. Other configurations of cloud management system 104, associated network connections, and other hardware and software resources are possible.

Figure 6:
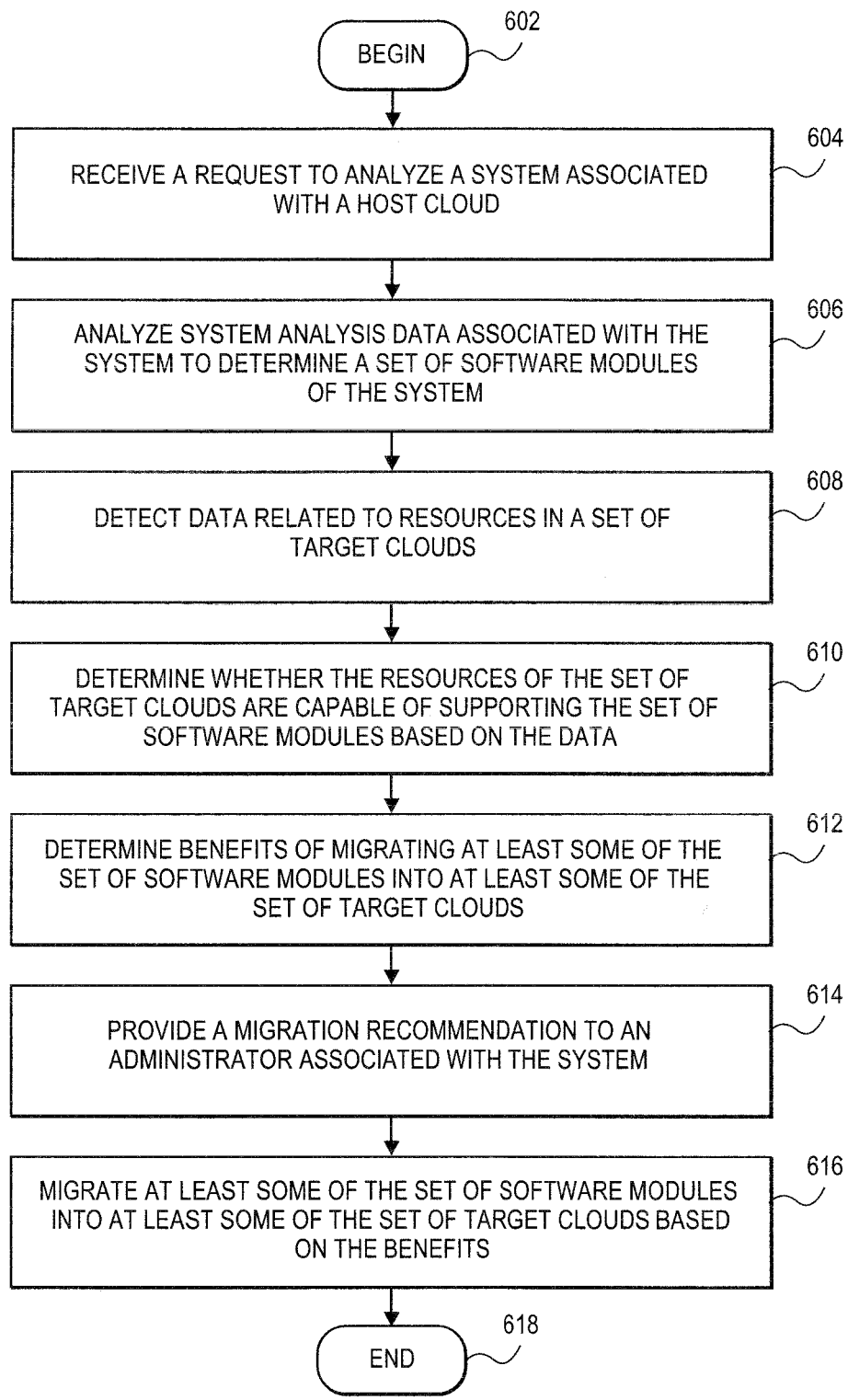
FIG. 6 illustrates a flowchart for migrating system software modules into one or more clouds, according to various embodiments.

FIG. 6 illustrates a flowchart for migrating system software modules into one or more clouds, according to various embodiments. In 602, processing can begin. In 604, a request to analyze a system associated with a host cloud can be received. In embodiments, the system can comprise one or more virtual machines. In 606, system analysis data associated with the system can be analyzed to determine a set of software modules of the system. In embodiments, the system analysis data can be program code executed by any software application or program associated with the system. In other embodiments, the set of software modules can be any software application or program capable of being executed on the system.

In 608, data related to resources in a set of target clouds can be detected. In embodiments, the set of target clouds can be any existing clouds detected over any network in any way. In 610, the system can determine whether the set of target clouds is capable of supporting the set of software modules based on the detected data. In embodiments, the system can determine whether the set of target clouds has the necessary resources to execute, facilitate, operate, or otherwise support the set of software modules.

In 612, the benefits of migrating at least some of the set of software modules into at least some of the set of target clouds can be determined. In embodiments, the benefits can relate to any metric such as, for example, cost effectiveness, resource consumption reduction, ease of use, and other benefits. In further embodiments, the benefits can be based on at least two of the set of software modules migrating to a single target cloud, or the set of software modules migrating to the set of target clouds on a one-to-one basis.

In 614, a migration recommendation can be provided to an administrator or entity associated with the system. In embodiments, the migration recommendation can be provided to any administrator or entity associated with the host cloud or the set of target clouds. In 616, at least some of the software modules of the set of software modules can be migrated into at least some of the set of target clouds based on the benefits. In embodiments, all of the software modules can be migrated into the set of target clouds regardless of the benefits of migration, or only the software modules for which a migration would be beneficial can be migrated into the set of target clouds. In 618, processing can end.

The foregoing description is illustrative, and variations in configuration and implementation may occur to persons skilled in the art. For example, while embodiments have been described which operate using one module migration tool 302 and associated cloud management system 104, in embodiments, one or more of module migration tool 302 and associated cloud management system 104, and/or other servers, data stores, and/or other logic or resources can be used. Other resources described as singular or integrated can in embodiments be plural or distributed, and resources described as multiple or distributed can in embodiments be combined. The scope of the present teachings is accordingly intended to be limited only by the following claims.

What is claimed is:

1. A method comprising:
analyzing a system in a host cloud;
determining, with a processor, a plurality of software modules of the system in view of the analysis;
determining a plurality of target clouds each of which has a respective capacity to support at least one of the plurality of software modules;
detecting data related to resources in the plurality of target clouds;
determining, in view of the data, whether to migrate a portion of the plurality of software modules into the plurality of target clouds; and
migrating one or more of the portion of the plurality of software modules into one or more of the plurality of target clouds.

2. The method of claim 1, wherein each of the one or more of the software modules is migrated into a different target cloud of the plurality of target clouds.

3. The method of claim 1, wherein at least two of the one or more of the software modules are migrated into a target cloud of the plurality of target clouds.

4. The method of claim 1, wherein analyzing the system in the host cloud comprises analyzing program code of the system.

5. The method of claim 4, wherein the plurality of software modules is determined from the program code of the system, and wherein the plurality of software modules is a plurality of applications executed by the system.

6. The method of claim 1, wherein the system in the host cloud is analyzed dynamically or statically.

7. The method of claim 1, further comprising:
generating a migration recommendation for the plurality of software modules into the plurality of target clouds; and
providing the migration recommendation to an administrator associated with the system.

8. The method of claim 1, wherein determining the plurality of target clouds comprises:
determining that a first target cloud of the plurality of target clouds has a capacity to support at least one software module of the plurality of software modules; and
determining that a second target cloud of the plurality of target clouds has a capacity to support an additional software module of the plurality of software modules.

9. The method of claim 1, wherein determining the plurality of target clouds comprises:
detecting data related to resources in the plurality of target clouds; and
determining a benefit of migrating the plurality of software modules into the plurality of target clouds in view of the data.

10. The method of claim 1, further comprising:
determining, in view of the data, not to migrate a remainder of the plurality of software modules into the plurality of target clouds.

11. A system comprising:
an interface to a plurality of resources in a cloud; and
a processor to communicate with the plurality of resources in the cloud via the interface, and to:
analyze a system in a host cloud;
determine a plurality of software modules of the system in view of the analysis;
determine a plurality of target clouds each of which has a respective capacity to support at least one of the plurality of software modules;
detect data related to resources in the plurality of target clouds;
determine, in view of the data, whether to migrate a portion of the plurality of software modules into the plurality of target clouds; and migrate one or more of the portion of the plurality of software modules into one or more of the plurality of target clouds.

12. The system of claim 11, wherein each of the one or more of the software modules is migrated into a different target cloud of the plurality of target clouds.

13. The system of claim 11, wherein at least two of the one or more of the software modules are migrated into a target cloud of the plurality of target clouds.

14. The system of claim 11, wherein to analyze the system in the host cloud comprises to analyze program code of the system.

15. The system of claim 14, wherein the plurality of software modules is determined from the program code of the system, and wherein the plurality of software modules is a plurality of applications executed by the system.

16. The system of claim 11, wherein the system in the host cloud is analyzed dynamically or statically.

17. The system of claim 11, wherein the processor is further to:
   generate a migration recommendation for the plurality of software modules into the plurality of target clouds; and
   provide the migration recommendation to an administrator associated with the system.

18. The system of claim 11, wherein to determine the plurality of target clouds comprises:
   to determine that a first target cloud of the plurality of target clouds has a capacity to support at least one software module of the plurality of software modules; and
   to determine that a second target cloud of the plurality of target clouds has a capacity to support an additional software module of the plurality of software modules.

19. The system of claim 11, wherein to determine the plurality of target clouds comprises:
   to detect data related to resources in the plurality of target clouds; and
   to determine a benefit of migrating the plurality of software modules into the plurality of target clouds in view of the data.

20. The system of claim 11, wherein the processor is further to:
   determine, in view of the data, not to migrate a remainder of the plurality of software modules into the plurality of target clouds.

* * * * *